United States Patent
Iwata et al.

(10) Patent No.: US 11,442,773 B2
(45) Date of Patent: Sep. 13, 2022

(54) EQUIPMENT MANAGEMENT METHOD, EQUIPMENT MANAGEMENT APPARATUS AND EQUIPMENT MANAGEMENT SYSTEM

(71) Applicant: KYOCERA Corporation, Kyoto (JP)

(72) Inventors: Kei Iwata, Kawasaki (JP); Taku Nakayama, Yamato (JP); Takashi Furukawa, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 367 days.

(21) Appl. No.: 16/498,451

(22) PCT Filed: Mar. 28, 2018

(86) PCT No.: PCT/JP2018/012641
§ 371 (c)(1),
(2) Date: Sep. 27, 2019

(87) PCT Pub. No.: WO2018/181422
PCT Pub. Date: Oct. 4, 2018

(65) Prior Publication Data
US 2020/0394068 A1 Dec. 17, 2020

(30) Foreign Application Priority Data

Mar. 29, 2017 (JP) .............................. JP2017-064898

(51) Int. Cl.
*G06F 9/48* (2006.01)
*G06F 16/23* (2019.01)
(Continued)

(52) U.S. Cl.
CPC ............ *G06F 9/485* (2013.01); *G06F 9/5038* (2013.01); *G06F 9/542* (2013.01);
(Continued)

(58) Field of Classification Search
CPC ..................................................... G06F 9/485
See application file for complete search history.

(56) References Cited

U.S. PATENT DOCUMENTS

| 7,904,751 B2 * | 3/2011 | Marisetty ............ G06F 11/0724 714/10 |
| 2006/0015293 A1 * | 1/2006 | Godara .............. A61B 18/1206 702/183 |
| 2017/0039530 A1 | 2/2017 | Natu et al. |

FOREIGN PATENT DOCUMENTS

| JP | H7-320174 A | 12/1995 |
| JP | H8-221295 A | 8/1996 |

(Continued)

OTHER PUBLICATIONS

Gabriel Jakobson et al., "Alarm Correlation", IEEE Network, Nov. 1993, 52-59 pages, 8pp.

*Primary Examiner* — Charlie Sun
(74) *Attorney, Agent, or Firm* — Hauptman Ham, LLP

(57) ABSTRACT

An equipment management method comprises a step A of registering, in a database, an alert that includes content of an equipment error, a step B of registering, in the database, a processing status that includes processing of the error, a step C of managing a thread for managing the alert and the processing status in a one-to-one relationship, and a step D of transmitting, to a user terminal, an error notification that includes information indicating generation of the error. The step D includes a step of, when two or more errors do not satisfy a predetermined condition, not integrating the two or more errors in one error notification, and, when the two or more errors satisfy the predetermined condition, integrating the two or more errors in one error notification.

12 Claims, 15 Drawing Sheets

(51) Int. Cl.
*G06F 9/50* (2006.01)
*G06F 9/54* (2006.01)
*H04L 41/0631* (2022.01)
*H04L 41/069* (2022.01)

(52) U.S. Cl.
CPC ........ *G06F 16/2379* (2019.01); *H04L 41/064* (2013.01); *H04L 41/069* (2013.01)

(56) References Cited

FOREIGN PATENT DOCUMENTS

| | | |
|---|---|---|
| JP | 2005-182399 A | 7/2005 |
| JP | 2012-64045 A | 3/2012 |
| JP | 201552850 A | 3/2015 |

* cited by examiner

FIG. 3

```
ITEM NUMBER: 150000000123
AREA: AAA POWER PLANT
EQUIPMENT: AAA-PCS3
ALERT TYPES: ERROR A, ERROR C, ERROR E

ABNORMALITY HAS BEEN GENERATED. PLEASE ACCESS THE URL BELOW
AND RESPOND ACCORDINGLY.

REFERRING URL: http://abcde/xxxxx/yyyyy?id=150000000123
```

FIG. 4

```
ITEM NUMBER: 150000000234
AREA: BBB POWER PLANT
○EQUIPMENT: BBB-PCS1
   ALERT TYPES: ERROR B, ERROR D
○EQUIPMENT: BBB-PCS2
   ALERT TYPES: ERROR B, ERROR D

ABNORMALITY HAS BEEN GENERATED. PLEASE ACCESS THE URL BELOW
AND RESPOND ACCORDINGLY.

REFERRING URL: http://abcde/xxxxx/yyyyy?id=150000000234
```

FIG. 5

```
ITEM NUMBER: 150000000345-1
AREA: AAA POWER PLANT
○EQUIPMENT: AAA-PCS1
   ALERT TYPES: ERROR B, ERROR D, ERROR F
○EQUIPMENT: AAA-PCS2
   ALERT TYPES: ERROR B, ERROR D, ERROR F
○EQUIPMENT: AAA-PCS3
   ALERT TYPES: ERROR B, ERROR D, ERROR F

ITEM NUMBER: 150000000345-2
AREA: BBB POWER PLANT
○EQUIPMENT: BBB-PCS1
   ALERT TYPES: ERROR B, ERROR D
○EQUIPMENT: BBB-PCS2
   ALERT TYPES: ERROR B, ERROR D

ABNORMALITY HAS BEEN GENERATED. PLEASE ACCESS THE URL BELOW
AND RESPOND ACCORDINGLY.

AAA POWER PLANT REFERRING URL: http://abcde/xxxxx/yyyyy?id=150000000345-1
BBB POWER PLANT REFERRING URL: http://abcde/xxxxx/yyyyy?id=150000000345-2
```

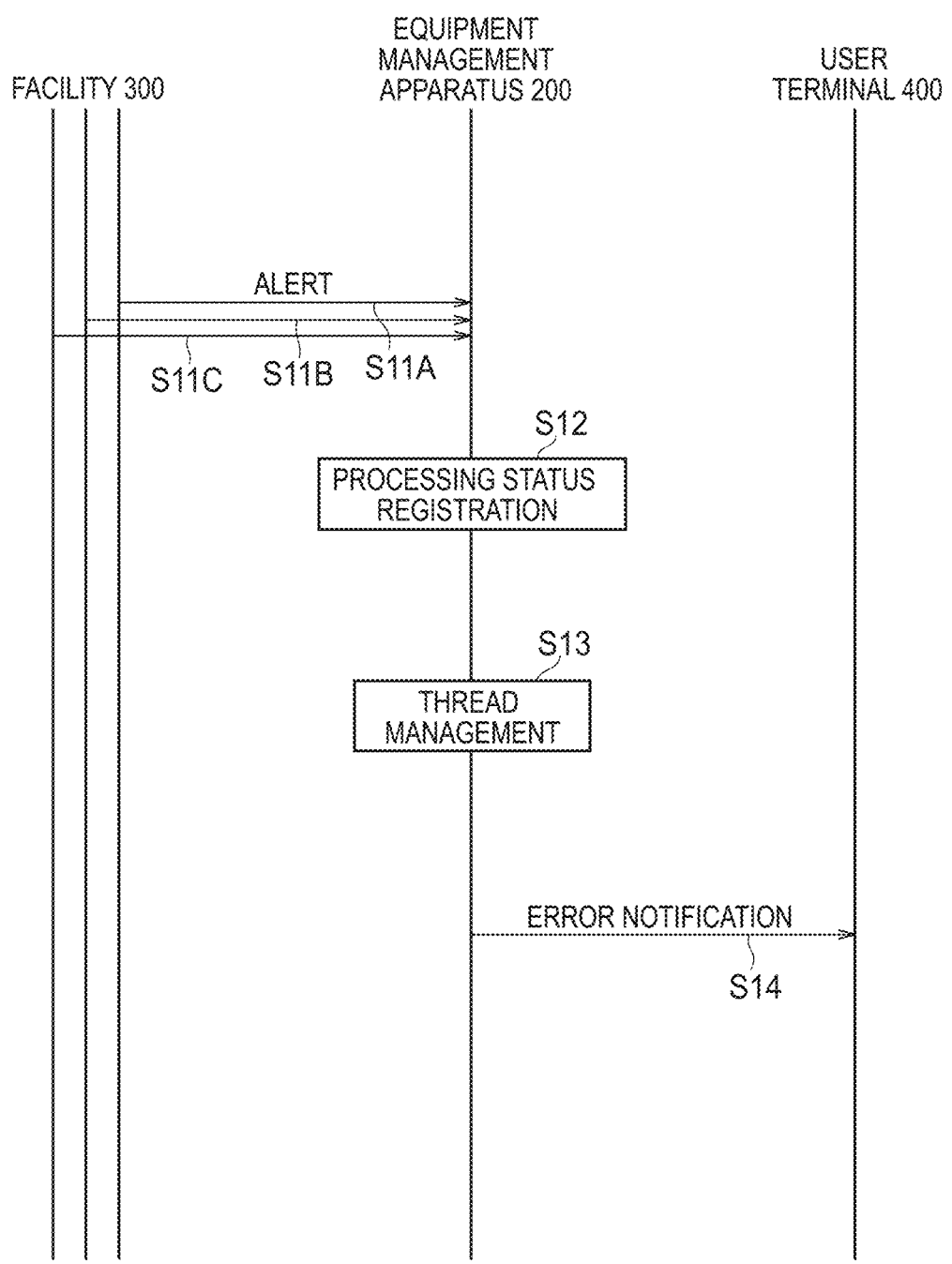

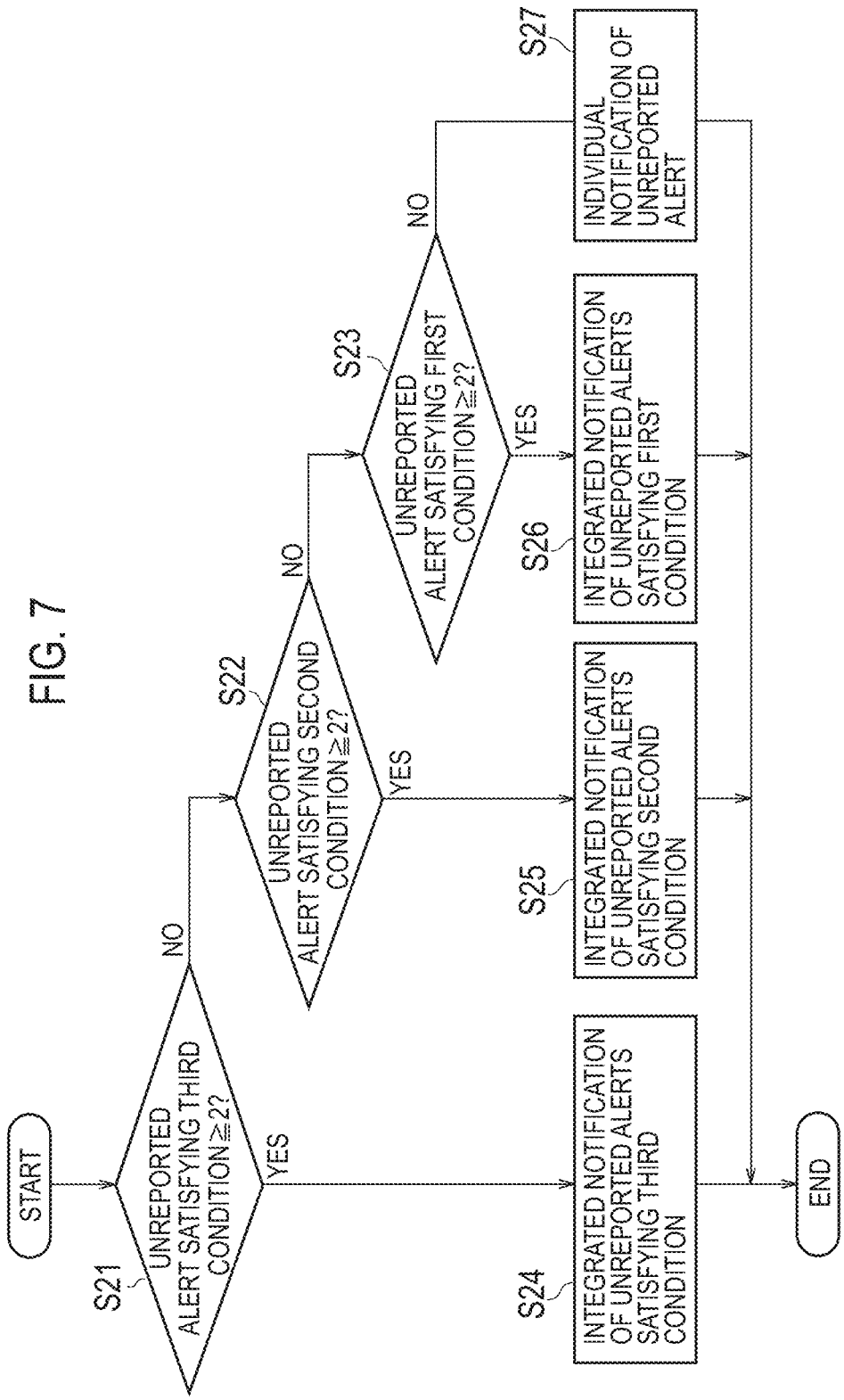

FIG. 14

| MANAGEMENT ID | DETAILS | STATUS | TIME ELAPSED | FACILITY | EQUIPMENT TYPE | TARGET EQUIPMENT | CAUSE | OPERATING STATUS | CONTINUOUS STATUS |
|---|---|---|---|---|---|---|---|---|---|
| A15000001 | ≡ | AWAITING ARRANGEMENT | 0.1H | FACILITY A | PCS | PCS_A_2 | PCS ALERT: ERROR C GENERATED | 91.2% | CONTINUOUS |
| A15000002 | ≡ | AWAITING ARRANGEMENT | 0.5H | FACILITY C | PCS | PCS_C_3 | PCS ALERT: ERROR C GENERATED | 95.9% | CONTINUOUS |
| A15000003 | ≡ | ALREADY ARRANGED | 1.2H | FACILITY A | GATEWAY | GW_A_1 | GW ALERT: ERROR A GENERATED | | CONTINUOUS |
| A15000004 | ≡ | AWAITING ARRANGEMENT | 5.6H 3.3H AFTER RECURRENCE | FACILITY B | PCS | PCS_B_1 | PCS ALERT: ERROR B GENERATED | 75.3% | CONTINUOUS RECURRENCE COUNT:3 |
| A15000005 | ≡ | ALREADY ARRANGED | 8.5H 1.2H AFTER RECURRENCE | FACILITY B | PCS | PCS_B_2 | PCS ALERT: ERROR C GENERATED | 98.8% | AUTOMATIC RECOVERY RECURRENCE COUNT:2 |
| A15000006 | ≡ | ALREADY ARRANGED | 15.7H | FACILITY C | PCS | PCS_C_2 | PCS ALERT: ERROR B GENERATED | 83.4% | REPAIRED RECOVERY PROVISIONAL RESPONCE |
| A15000007 | ≡ | ALREADY ARRANGED | 25.2H 10.4H AFTER RECURRENCE | FACILITY A | PCS | PCS_A_2 | PCS ALERT: ERROR B GENERATED | 96.5% | CONTINUOUS PROVISIONAL RESPONSE RECURRENCE COUNT:1 |
| A15000008 | ≡ | WORKING | 32.4H | FACILITY B | GATEWAY | GW_B_1 | GW ALERT: ERROR A GENERATED | | CONTINUOUS |

FIG. 15

| MANAGEMENT ID | DETAILS | STATUS | TIME ELAPSED | FACILITY | EQUIPMENT TYPE | TARGET EQUIPMENT | CAUSE | OPERATING STATUS | CONTINUOUS STATUS |
|---|---|---|---|---|---|---|---|---|---|
| A15000001 | ≡ | AWAITING ARRANGEMENT | 0.1H | FACILITY A | PCS | PCS_A_2 | PCS ALERT: ERROR C GENERATED | 91.2% | CONTINUOUS |
| A15000002 | ≡ | AWAITING ARRANGEMENT | 0.5H | FACILITY C | PCS | PCS_C_3 | PCS ALERT: ERROR C GENERATED | 95.9% | CONTINUOUS |
| A15000003 | ≡ | ALREADY ARRANGED | 1.2H | FACILITY A | GATEWAY | GW_A_1 | GW ALERT: ERROR A GENERATED | | CONTINUOUS |
| A15000004 | ≡ | AWAITING ARRANGEMENT | 5.6H 3.3H AFTER RECURRENCE | FACILITY B | PCS | PCS_B_1 | PCS ALERT: ERROR B GENERATED | 75.3% | CONTINUOUS RECURRENCE COUNT:3 |
| A15000005 | ≡ | ALREADY ARRANGED | 8.5H 1.2H AFTER RECURRENCE | FACILITY B | PCS | PCS_B_2 | PCS ALERT: ERROR C GENERATED | 98.8% | AUTOMATIC RECOVERY RECURRENCE COUNT:2 |
| A15000006 | ≡ | ALREADY ARRANGED | 15.7H | FACILITY C | PCS | PCS_C_2 | PCS ALERT: ERROR B GENERATED | 83.4% | REPAIRED RECOVERY PROVISIONAL RESPONSE |
| A15000007 | ≡ | ALREADY ARRANGED | 25.2H 10.4H AFTER RECURRENCE | FACILITY A | PCS | PCS_A_2 | PCS ALERT: ERROR B GENERATED | 96.5% | CONTINUOUS PROVISIONAL RESPONSE RECURRENCE COUNT:1 |
| A15000008 | ≡ | WORKING | 32.4H | FACILITY B | GATEWAY | GW_B_1 | GW ALERT: ERROR A GENERATED | | CONTINUOUS |

FIG. 16

| MANAGEMENT ID | DETAILS | STATUS | TIME ELAPSED | FACILITY | EQUIPMENT TYPE | TARGET EQUIPMENT | CAUSE | OPERATING STATUS | CONTINUOUS STATUS |
|---|---|---|---|---|---|---|---|---|---|
| A15000001 | ≡ | AWAITING ARRANGEMENT | 0.1H | FACILITY A | PCS | PCS_A_2 | PCS ALERT: ERROR C GENERATED | 91.2% | CONTINUOUS |
| A15000002 | ≡ | AWAITING ARRANGEMENT | 0.5H | FACILITY C | PCS | PCS_C_3 | PCS ALERT: ERROR C GENERATED | 95.9% | CONTINUOUS |
| A15000003 | ≡ | ALREADY ARRANGED | 1.2H | FACILITY A | GATEWAY | GW_A_1 | GW ALERT: ERROR A GENERATED | | CONTINUOUS |
| A15000004 | ≡ | AWAITING ARRANGEMENT | 5.6H 3.3H AFTER RECURRENCE | FACILITY B | PCS | PCS_B_1 | PCS ALERT: ERROR B GENERATED | 75.3% | CONTINUOUS RECURRENCE COUNT: 3 |
| A15000005 | ≡ | ALREADY ARRANGED | 8.5H 1.2H AFTER RECURRENCE | FACILITY B | PCS | PCS_B_2 | PCS ALERT: ERROR C GENERATED | 98.8% | AUTOMATIC RECOVERY RECURRENCE COUNT: 2 |
| A15000006 | ≡ | ALREADY ARRANGED | 15.7H | FACILITY C | PCS | PCS_C_2 | PCS ALERT: ERROR B GENERATED | 83.4% | REPAIRED RECOVERY PROVISIONAL RESPONSE |
| A15000007 | ≡ | ALREADY ARRANGED | 25.2H 10.4H AFTER RECURRENCE | FACILITY A | PCS | PCS_A_2 | PCS ALERT: ERROR B GENERATED | 96.5% | CONTINUOUS PROVISIONAL RESPONSE RECURRENCE COUNT: 1 |
| A15000008 | ≡ | WORKING | 32.4H | FACILITY B | GATEWAY | GW_B_1 | GW ALERT: ERROR A GENERATED | | CONTINUOUS |

FIG. 17

| MANAGEMENT ID | DETAILS | STATUS | TIME ELAPSED | FACILITY | EQUIPMENT TYPE | TARGET EQUIPMENT | CAUSE | OPERATING STATUS | CONTINUOUS STATUS |
|---|---|---|---|---|---|---|---|---|---|
| A15000001 | [≡] | AWAITING ARRANGEMENT | 0.1H | FACILITY A | PCS | PCS_A_2 | PCS ALERT: ERROR C GENERATED | 91.2% | CONTINUOUS |
| A15000002 | [≡] | AWAITING ARRANGEMENT | 0.5H | FACILITY C | PCS | PCS_C_3 | PCS ALERT: ERROR C GENERATED | 95.9% | CONTINUOUS |
| A15000003 | [≡] | ALREADY ARRANGED | 1.2H | FACILITY A | GATEWAY | GW_A_1 | GW ALERT: ERROR A GENERATED | | CONTINUOUS |
| A15000004 | [≡] | AWAITING ARRANGEMENT | 5.6H 3.3 H AFTER RECURRENCE | FACILITY B | PCS | PCS_B_1 | PCS ALERT: ERROR B GENERATED | 75.3% | CONTINUOUS RECURRENCE COUNT:3 |
| A15000005 | [≡] | ALREADY ARRANGED | 8.5H 1.2 H AFTER RECURRENCE | FACILITY B | PCS | PCS_B_2 | PCS ALERT: ERROR C GENERATED | 98.8% | AUTOMATIC RECOVERY RECURRENCE COUNT:2 |
| A15000006 | [≡] | ALREADY ARRANGED | 15.7H | FACILITY C | PCS | PCS_C_2 | PCS ALERT: ERROR B GENERATED | 83.4% | REPAIRED RECOVERY PROVISIONAL RESPONSE |
| A15000007 | [≡] | ALREADY ARRANGED | 25.2H 10.4 H AFTER RECURRENCE | FACILITY A | PCS | PCS_A_2 | PCS ALERT: ERROR B GENERATED | 96.5% | CONTINUOUS PROVISIONAL RESPONSE RECURRENCE COUNT:1 |
| A15000008 | [≡] | WORKING | 32.4H | FACILITY B | GATEWAY | GW_B_1 | GW ALERT: ERROR A GENERATED | | CONTINUOUS |

EQUIPMENT MANAGEMENT METHOD, EQUIPMENT MANAGEMENT APPARATUS AND EQUIPMENT MANAGEMENT SYSTEM

RELATED APPLICATIONS

The present application is a National Phase of International Application No. PCT/JP2018/012641, filed Mar. 28, 2018, and claims priority based on Japanese Patent Application No. 2017-064898, filed Mar. 29, 2017.

TECHNICAL FIELD

The present invention relates to an equipment management method, an equipment management apparatus, and an equipment management system.

BACKGROUND ART

An equipment management system which manages various information relating to a plurality of equipments is known. As various information, basic information and maintenance information and so forth pertaining to the equipment may be considered. Basic information includes, for example, for example, an installation date, a default expiration date, and a rated power consumption, and the like. Maintenance information includes a history of previous maintenance (Patent Literature 1, for example).

CITATION LIST

Patent Literature

Patent Literature 1: Japanese application publication No. 2005-182399

SUMMARY OF INVENTION

An equipment management method according to a first aspect comprises a step A of registering, in a database, an alert that includes content of an equipment error, a step B of registering, in the database, a processing status that includes processing of the error, a step C of managing a thread for managing the alert and the processing status in a one-to-one relationship, and a step D of transmitting, to a user terminal, an error notification that includes information indicating generation of the error. The step D includes a step of, when two or more errors do not satisfy a predetermined condition, not integrating the two or more errors in one error notification, and, when the two or more errors satisfy the predetermined condition, integrating the two or more errors in one error notification.

An equipment management method according to a second aspect comprises a step A of registering, in a database, an alert that includes content of an equipment error, a step B of registering, in the database, a processing status that includes processing of the error, and a step C of managing a thread for managing the alert and the processing status in a one-to-one relationship. The step C includes a step of, when two or more threads do not satisfy a predetermined condition, not integrating the two or more threads, and, when the two or more threads satisfy the predetermined condition, integrating the two or more threads.

An equipment management apparatus according to a third aspect comprises a controller configured to register, in a database, an alert that includes content of an equipment error, and a transmitter configured to transmit, to a user terminal, an error notification that includes information indicating generation of the error. The controller is configured to register, in the database, a processing status that includes processing of the error, and manage a thread for managing the alert and the processing status in a one-to-one relationship. The transmitter is configured to not integrate two or more errors in one error notification when the two or more errors do not satisfy a predetermined condition and to integrate the two or more errors in one error notification when the two or more errors satisfy the predetermined condition.

An equipment management apparatus according to a forth aspect comprises a controller configured to register, in a database, an alert that includes content of an equipment error. The controller is configured to register, in the database, a processing status that includes processing of the error, manage a thread for managing the alert and the processing status in a one-to-one relationship, and not integrate two or more threads when the two or more threads do not satisfy a predetermined condition and integrate the two or more threads when the two or more threads satisfy the predetermined condition.

An equipment management system according to a fifth aspect has at least an equipment management apparatus. The equipment management apparatus comprises a controller configured to register, in a database, an alert that includes content of an equipment error, and a transmitter configured to transmit, to a user terminal, an error notification that includes information indicating generation of the error. The controller is configured to register, in the database, a processing status that includes processing of the error, and manage a thread for managing the alert and the processing status in a one-to-one relationship. The transmitter is configured to not integrate two or more errors in one error notification when the two or more errors do not satisfy a predetermined condition and to integrate the two or more errors in one error notification when the two or more errors satisfy the predetermined condition.

An equipment management system according to a sixth aspect has at least an equipment management apparatus. The equipment management apparatus comprises a controller configured to register, in a database, an alert that includes content of an equipment error. The controller is configured to register, in the database, a processing status that includes processing of the error, manage a thread for managing the alert and the processing status in a one-to-one relationship, and not integrate two or more threads when the two or more threads do not satisfy a predetermined condition and to integrate the two or more threads when the two or more threads satisfy the predetermined condition.

BRIEF DESCRIPTION OF DRAWINGS

FIG. 3 is a diagram illustrating an example of an error notification according to the embodiment.

FIG. 4 is a diagram illustrating an example of an error notification according to the embodiment.

FIG. 5 is a diagram illustrating an example of an error notification according to the embodiment.

FIG. 6 is a diagram illustrating an equipment management method according to the embodiment.

FIG. 7 is a diagram illustrating an equipment management method according to the embodiment.

FIG. 14 is a diagram illustrating an example of a list of threads according to a modified example 4.

FIG. 15 is a diagram illustrating an example of a list of threads according to the modified example 4.

FIG. 16 is a diagram illustrating an example of a list of threads according to the modified example 4.

FIG. 17 is a diagram illustrating an example of a list of threads according to the modified example 4.

DESCRIPTION OF EMBODIMENTS

Figure 1:
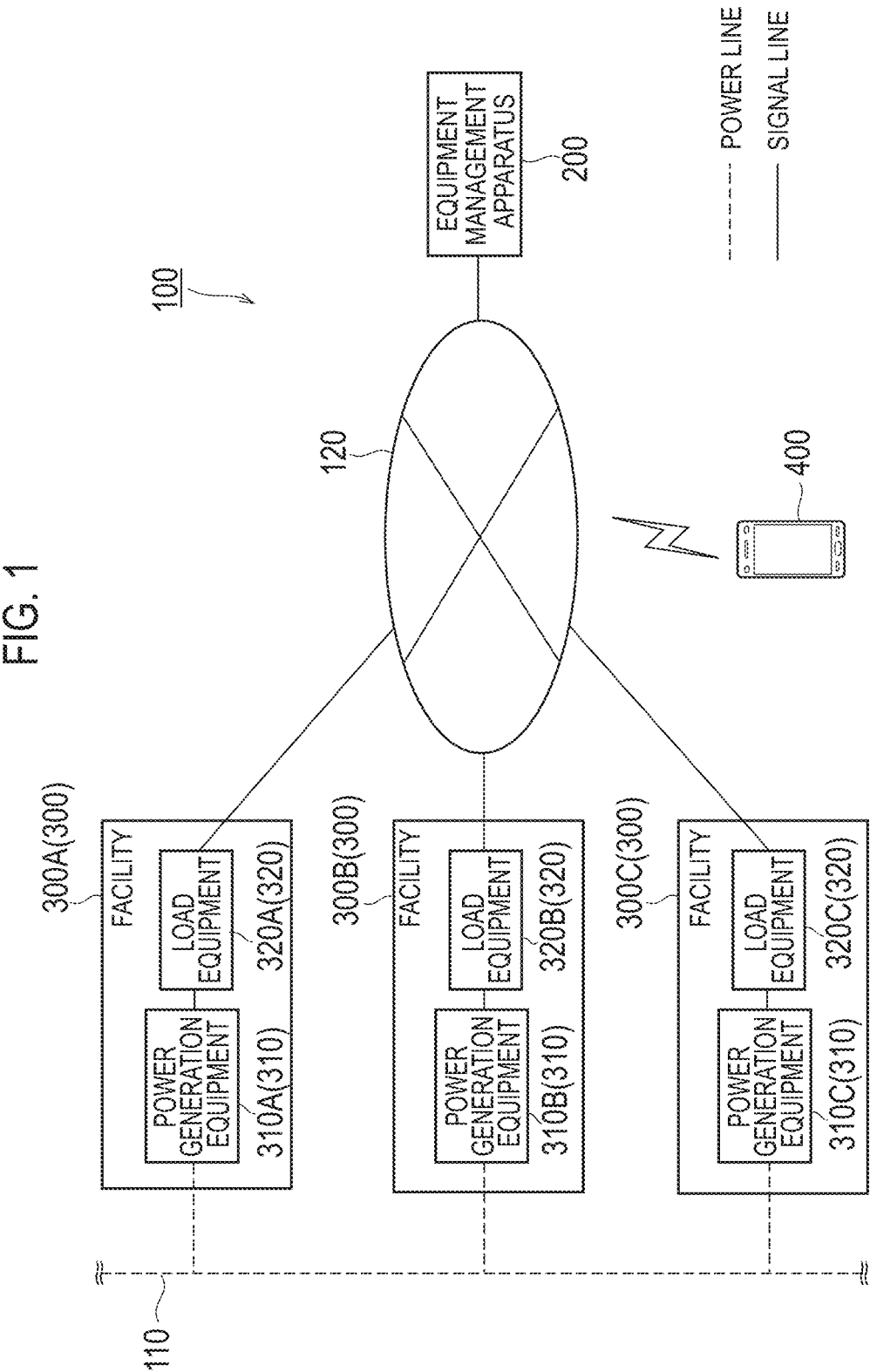
FIG. 1 is a diagram illustrating an equipment management system 100 according to an embodiment.

In recent years, in the equipment management system described in the background art, a mechanism (work flow) which, when an equipment error or the like has been generated, manages threads in which error content and error processing are associated with each other in a one-to-one relationship, has also been proposed. Furthermore, a mechanism which transmits an error notification to a user terminal in a one-to-one relationship with an error has also been proposed.

Therefore, there is a possibility of equipment errors occurring frequently as the number of equipments managed by the equipment management system increases. Accordingly, a multiplicity of threads is managed, and there is a possibility of a multiplicity of error notifications being reported. In such cases, work by a user to confirm a multiplicity of threads or a multiplicity of error notifications ends up being extremely complicated.

The present invention provides an equipment management method, an equipment management apparatus, and an equipment management system which make it possible to alleviate the work load of a user in confirming a multiplicity of threads or a multiplicity of error notifications.

An embodiment will be explained hereinbelow with reference to the drawings. Note that, in the description of the drawings hereinbelow, the same or similar reference numerals are assigned to the same or similar parts.

However, it should be noted that the drawings are schematics and that the proportions of each of the dimensions, and the like, differ from the real proportions and so forth. Therefore, specific dimensions and so forth should be determined by referring to the explanation hereinbelow. Furthermore, it is obvious that the drawings each contain parts whose dimensional relationships and proportions differ.

Embodiment

Equipment Management System

An equipment management system according to an embodiment will be explained hereinbelow. As illustrated in FIG. 1, an equipment management system 100 includes an equipment management apparatus 200, a facility 300, and a user terminal 400. In FIG. 1, facilities 300A to 300C are illustrated as examples of the facility 300. The equipment management apparatus 200 and the facility 300 are coupled to a network 120. The network 120 may provide a line between the equipment management apparatus 200 and the facility 300 and a line between the equipment management apparatus 200 and the user terminal 400. The network 120 is the internet, for example. The network 120 may also provide a dedicated line such as a VPN.

The equipment management apparatus 200 manages equipment that is provided in the facility 300. Details of the equipment management apparatus 200 will be provided subsequently (see FIG. 2).

The facility 300 includes a power generation equipment 310 and a load equipment 320. The power generation equipment 310 is an equipment that performs power generation and is coupled to a power grid 110. The power generation equipment 310 may also be an equipment that performs power generation by using natural energy such as solar rays, wind power or terrestrial heat. The power generation equipment 310 may be a fuel cell apparatus or may be a storage battery apparatus. The facility 300 may include power generation equipments 310 of two or more kinds. The load equipment 320 is an equipment that consumes power and is coupled to at least one of the power grid 110 and the power generation equipment 310. The load equipment 320 may be an air conditioning equipment or may be a lighting equipment.

A user terminal 400 may also be a terminal that is owned by a user such as an administrator who manages an equipment provided in the facility 300. The user terminal 400 may also be a terminal that is owned by a user such as an operator who performs maintenance on the equipment provided in the facility 300. The user terminal 400 may also be a smartphone, a tablet terminal, or a personal computer.

Here, the equipment management system 100 may also include a power management server. The power management server transmits, to the facility 300, a power flow control message that requests control of a power flow amount from the power grid 110 to the facility 300, a reverse power control message that requests control of a reverse power flow amount from the facility 300 to the power grid 110, and a power supply control message that requests control of the power generation equipment 310 (distributed power supply) provided in the facility 300, and the like, for example.

Equipment Management Apparatus

Figure 2:
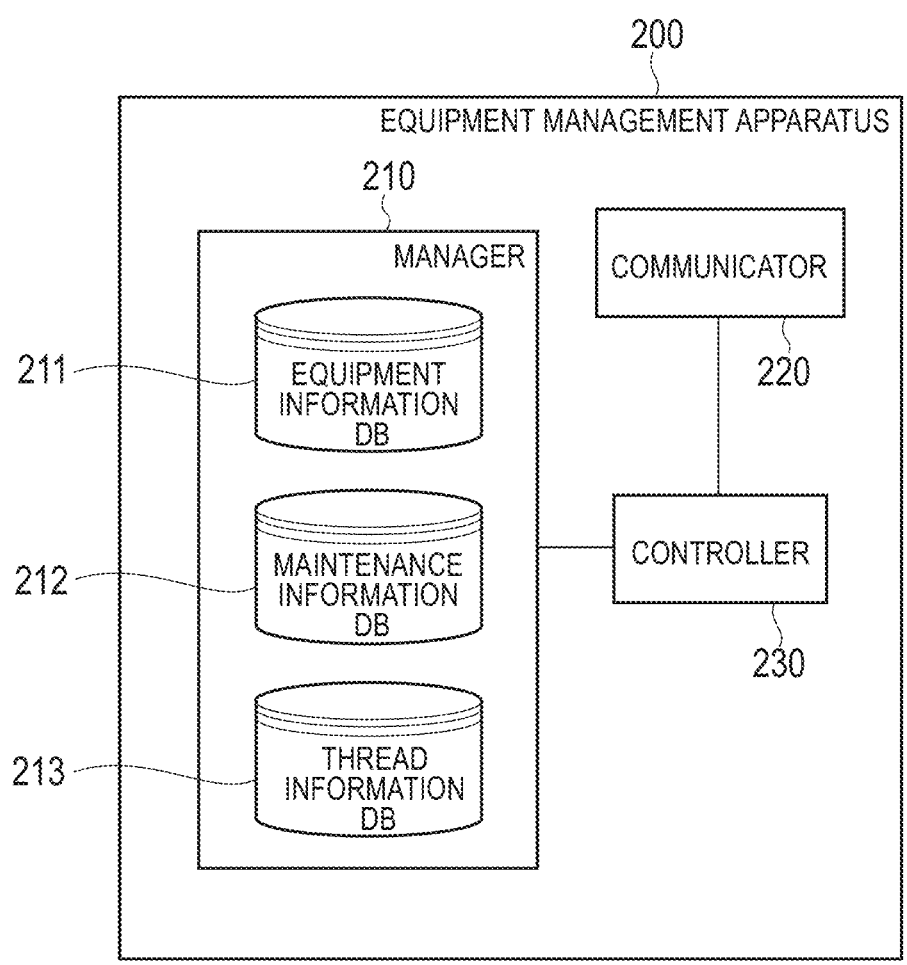
FIG. 2 is a diagram illustrating an equipment management apparatus 200 according to the embodiment.

An equipment management apparatus according to the embodiment will be explained hereinbelow. As illustrated in FIG. 2, the equipment management apparatus 200 includes a manager 210, a communicator 220, and a controller 230.

The manager 210 is configured from a storage medium such as a nonvolatile memory and/or an HDD and manages information relating to a plurality of the facility 300. The manager 210 includes an equipment information DB 211, a maintenance information DB 212, and a thread information DB 213.

The equipment information DB 211 stores basic information on the equipments provided in each of the plurality of facilities 300. The equipment information DB 211 stores a facility name, a facility ID, an equipment name, an equipment ID, a year of introduction, years elapsed, and an expiration date in association with each other, for example. The facility name is the name of the facility 300 where the equipment is installed. The facility ID is an identifier which identifies the facility 300. The equipment name is the name of the equipment. The equipment ID is an identifier which identifies the equipment. The year of introduction is the year when the equipment has been introduced. The years elapsed are the years that have passed since the equipment has been introduced. The expiration date is established by the equipment manufacturer or the like and is information indicating the period during which the equipment can be suitably used after the equipment is introduced.

The maintenance information DB 212 stores, for each of the plurality of facilities 300, maintenance information on the equipments which are provided in each of the plurality of facilities 300. The maintenance information DB 212 stores a facility name, an equipment name, a maintenance date, a maintenance overview, and maintenance details in association with each another, for example. In addition to the foregoing information, the maintenance information DB 212 may store a facility ID and an equipment ID in association with each other. The facility name and equipment name are as described above. The maintenance date is a date when maintenance is performed. The maintenance overview is information indicating a maintenance overview, and the maintenance details are information indicating details of the maintenance. The maintenance information relating to the embodiment may include at least a maintenance period (schedule) for performing maintenance of the power generation equipment 310 in the future. The maintenance information may also include a maintenance period when maintenance of the power generation equipment 310 is performed in the past.

Here, maintenance includes, for example, inspections to examine a deteriorated condition of equipment, upkeep in which light repairs are carried out at the time of inspection, repairs to deal with equipment defects to restore equipment functions and performance to an initial installation state, and replacements where an existing equipment is exchanged for a new equipment, and so forth.

The thread information DB 213 stores threads for managing an alert and a processing status in a one-to-one relationship. The alert is an information element that includes content of an error in equipment provided in the facility 300. The alert is transmitted from the facility 300. The processing status is an information element that includes processing of an error in equipment provided in the facility 300. The processing status is generated automatically and is updated by a user such as an operator who performs maintenance. Processing statuses may include "awaiting arrangement" where processing of an error has not been arranged, "arranged" where processing of the error has been arranged, "work in progress" where processing of the error is being performed, and "completed" where processing of the error has been completed. Processing of errors may include, as mentioned hereinabove, inspections, upkeep, repairs, exchanges, and the like. A thread is one unit for managing the relationship between an alert and a processing status. A thread may be an information element for viewing such a relationship with one click, for example. However, a thread may be an information element that does not depart from a concept for managing an alert and a processing status in a one-to-one relationship and need not be an information element for viewing the aforementioned relationship with one click.

The communicator 220 is configured from a communication module and performs communication with the facility 300 and user terminal 400 via the network 120. The communicator 220 receives, from the facility 300, an alert that includes the content of an error in equipment provided in the facility 300. The communicator 220 transmits, to the user terminal 400, an error notification that includes information indicating the generation of an error in equipment provided in the facility 300.

The controller 230 is configured from a memory, a CPU, and the like and controls each configuration provided in the equipment management apparatus 200. In this embodiment, the controller 230 performs the control illustrated hereinbelow, for example.

The controller 230 registers, in the thread information DB 213, an alert that includes content of an error in equipment provided in the facility 300. The controller 230 registers, in the thread information DB 213, a processing status that includes processing of an error in equipment provided in the facility 300. The controller 230 manages threads for managing an alert and a processing status in a one-to-one relationship. The threads are stored in the thread information DB 213, as mentioned earlier. That is, the controller 230 manages threads by using the thread information DB 213.

Here, the controller 230 determines that two or more errors will be integrated in one error notification when two or more errors satisfy a predetermined condition. In such a case, the communicator 220 transmits, to the user terminal 400, an error notification that includes information indicating the generation of two or more errors. That is, the communicator 220 transmits one error notification to the user terminal 400. On the other hand, when two or more errors do not satisfy a predetermined condition, the controller 230 determines that the two or more errors will not be integrated in one error notification. In such a case, the communicator 220 transmits an error notification to the user terminal 400 in a one-to-one relationship with each of the two or more errors. That is, the communicator 220 transmits two or more error notifications to the user terminal 400.

Here, predetermined conditions may also include a condition that two or more errors are generated by an identical cause. The identical cause may be the cause of one of the two or more errors or may be a different cause from the cause of the two or more errors. A cause that is different from the cause of the two or more errors may also be a cause that is specified by an alert transmitted from the facility 300 (for example, an infrastructure malfunction (power outage or the like) owing to a disaster or the like).

The predetermined conditions may also include a condition that two or more errors are generated by an identical cause in one equipment. The predetermined conditions may also include a condition that two or more errors are generated by an identical cause in two or more equipments provided in one area. The predetermined conditions may also include a condition that two or more errors are generated by an identical cause in two or more equipments which are provided in two or more areas.

An area may be regarded as an area where one facility 300 is provided or may be regarded as an area where two or more grouped facilities 300 are provided. An area may be regarded as an area in which two or more grouped equipments are provided for one or more facilities 300. The grouping of two or more facilities 300 may also be performed based on a coupling relationship between the facilities 300 via the power grid 110, for example. The grouping of two or more equipments may also be performed based on a coupling relationship between the equipments, for example. Thus, an area may be an area that is partitioned by a geographic element or may be an area that is partitioned by at least any one coupling relationship between the facilities 300 and the equipment.

The predetermined condition may further include a temporal element. Specifically, the predetermined condition may also include a condition (hereinafter a first condition) that two or more errors are generated by an identical cause in a first time period (60 seconds, for example) in one equipment. The predetermined condition may also include a condition (hereinafter a second condition) that two or more errors are generated by an identical cause in a second time period (120 seconds, for example) that is longer than the first time period in two or more equipments which are provided in one area. The predetermined condition may also include a condition (hereinafter a third condition) that two or more errors are generated by an identical cause in a third time period (180 seconds, for example) that is longer than the second time period in two or more equipments which are provided in two or more areas.

The first time period may also be prescribed based on an alert collection frequency. An alert collection frequency may be a frequency that issues an alert inquiry to a facility 300 or may be a frequency at which the controller 230 confirms a buffer that stores alerts received from a facility 300. The second time period may also be prescribed based on a permissible delay time by a system for two or more equipments which are provided in one area. The third time period may also be prescribed based on a permissible delay time by a system for two or more areas.

The first, second and third time periods may also be prescribed based on error content. When a wide range of errors are generated by a cause such as a power outage owing to a defect in a power cable, relatively long time periods may be prescribed as the first, second and third time periods. In a case where an error is generated by a cause such as a power outage, relatively long time periods may also be prescribed as the first, second and third time periods for equipments or facilities 300 that have an abnormal power supply.

The first, second and third time periods may also be prescribed based on human resources for confirming alerts. For example, the scarcer human resources are, the longer the relatively long time periods that may be prescribed as the first, second and third time periods.

Here, the first, second and third conditions need not be regarded as exclusive conditions. That is, two or more conditions among the first, second and third conditions may be satisfied simultaneously.

An Example of an Error Notification

An example of an error notification will be explained hereinbelow. As illustrated in FIGS. 3 to 5, error notifications include information elements such as "item number," "area," "alert type," "message," and "referring URL." "Item number" is an identifier which is assigned to an error notification. "Area" is a name of an area where equipment in which an error has been generated is provided. "Equipment" is an identifier of equipment in which an error has been generated. "Message" is a character string that guides an action which a user is to take. "Referring URL" is a URL (Uniform Resource Locator) for accessing a thread that is stored in the thread information DB 213.

First, an example of an error notification in a case where the foregoing first condition has been satisfied will be explained. As illustrated in FIG. 3, in an error notification pertaining to such a case, three errors (here, an error A, error C and error E) are integrated by taking one area and one equipment as a target. The error A, error C and error E are an example of errors that are generated by an identical cause, and the content of the foregoing errors is not particularly restricted.

Second, an example of an error notification in a case where the foregoing second condition has been satisfied will be explained. As illustrated in FIG. 4, in an error notification pertaining to such a case, four errors (here, two errors B and two errors D) are integrated by taking two equipments in one area as a target. The errors B and errors D are an example of errors that are generated by an identical cause, and the content of the foregoing errors is not particularly restricted.

Third, an example of an error notification in a case where the foregoing third condition has been satisfied will be explained. As illustrated in FIG. 5, in an error notification pertaining to such a case, 13 errors (here, five errors B, five errors D, and three errors F) are integrated by taking five equipments in two areas as a target. The errors B, errors D and errors F are an example of an error generated by an identical cause, and the content of the foregoing errors is not particularly restricted.

In the case illustrated in FIG. 5, two referring URLs per area are reported as the "referring URL." However, when a thread is managed for each area, one referring URL may be reported as the "referring URL".

Equipment Management Method

An equipment management method according to the embodiment will be explained hereinbelow.

As illustrated in FIG. 6, in step S11, the facility 300 transmits an alert, which includes the content of an error in equipment that is provided in the facility 300, to the equipment management apparatus 200. Here, three alerts are transmitted to the equipment management apparatus 200 (steps S11A, S11B and S11C).

In step S12, the equipment management apparatus 200 registers, in the thread information DB 213, a processing status that includes processing of an error in equipment provided in the facility 300.

In step S13, the equipment management apparatus 200 manages threads for managing an alert and a processing status in a one-to-one relationship. The threads are stored in the thread information DB 213, as mentioned earlier.

In step S14, the equipment management apparatus 200 transmits an error notification to the user terminal 400. Here, when two or more errors satisfy a predetermined condition, the equipment management apparatus 200 transmits an error notification including information indicating the generation of two or more errors. On the other hand, when two or more errors do not satisfy a predetermined condition, the equipment management apparatus 200 transmits an error notification in a one-to-one relationship with each of the two or more errors.

The description of the details of step S14 will continue next with reference to FIG. 7. FIG. 7 is a flow that is repeated for each predetermined cycle (5 minutes, for example). The predetermined cycle may also be a longer cycle than the aforementioned third time period, for example.

As illustrated in FIG. 7, in step S21, the equipment management apparatus 200 determines whether or not there are two or more unreported alerts which satisfy the aforementioned third condition. When the determination result is YES, the processing of step S24 is performed, and when the determination result is NO, the processing of step S22 is performed.

In step S22, the equipment management apparatus 200 determines whether or not there are two or more unreported alerts which satisfy the aforementioned second condition. When the determination result is YES, the processing of step S25 is performed, and when the determination result is NO, the processing of step S23 is performed.

In step S23, the equipment management apparatus 200 determines whether or not there are two or more unreported alerts which satisfy the aforementioned first condition. When the determination result is YES, the processing of step S26 is performed, and when the determination result is NO, the processing of step S27 is performed.

In step S24, the equipment management apparatus 200 integrates two or more unreported alerts which satisfy the third condition. That is, the equipment management apparatus 200 transmits an error notification that includes information indicating the generation of two or more errors (unreported alerts).

In step S25, the equipment management apparatus 200 integrates two or more unreported alerts which satisfy the second condition. That is, the equipment management apparatus 200 transmits an error notification that includes information indicating the generation of two or more errors (unreported alerts).

In step S26, the equipment management apparatus 200 integrates two or more unreported alerts which satisfy the first condition. That is, the equipment management apparatus 200 transmits an error notification that includes information indicating the generation of two or more errors (unreported alerts).

In step S27, the equipment management apparatus 200 individually transmits one error (unreported alert). When an unreported alert does not exist, the processing of step S27 is omitted.

In FIG. 7, a case in which the first, second, and third conditions are used as predetermined conditions is illustrated as an example. However, the embodiment is not limited to or by such a case. The predetermined conditions may also include a temporal element.

Action and Effect

In the embodiment, when two or more errors satisfy a predetermined condition, the equipment management apparatus 200 transmits, to the user terminal 400, an error notification including information indicating the generation of two or more errors. With such a configuration, in comparison with a case where an error notification is transmitted to the user terminal 400 for each error, the work load of the user who confirms error notifications can be alleviated.

In the embodiment, when two or more errors do not satisfy a predetermined condition, the equipment management apparatus 200 transmits, to the user terminal 400, an error notification in a one-to-one relationship with each of the two or more errors. In this configuration, instances where error generation is overlooked can be reduced because the integration of two or more errors into one error notification is not performed without restriction.

Modified Example 1

A modified example 1 of the embodiment will be explained hereinbelow. Points of difference from the embodiment will primarily be explained hereinbelow. The modified example 1 can be combined with the aforementioned embodiment.

Specifically, in the embodiment, a case where two or more errors satisfying a predetermined condition are integrated into one error notification has been described. In contrast, in the modified example 1, the integration of two or more threads which satisfy a predetermined condition will be described.

To explain the foregoing in detail, the controller 230 of the equipment management apparatus 200 integrates two or more threads when two or more threads satisfy a predetermined condition. Here, integrated threads may also include an alert and a processing status for two or more errors. On the other hand, when two or more threads do not satisfy the predetermined condition, the controller 230 does not integrate the two or more threads.

Here, the predetermined condition may include a condition that two or more threads are generated by an identical cause. The identical cause may be the cause of generation of any one of the two or more threads or may be a different cause from the cause of generation of the two or more threads. A cause that is different from the cause of generation of the two or more threads may also be a cause that is specified by an alert transmitted from the facility 300 (for example, an infrastructure malfunction (power outages and so forth) owing to a disaster or the like).

The predetermined condition may also include a condition that two or more threads are generated by an identical cause in one equipment. The predetermined condition may also include a condition that two or more threads are generated by an identical cause in two or more equipments which are provided in one area. The predetermined condition may also include a condition that two or more threads are generated by an identical cause in two or more equipments which are provided in two or more areas. The approach regarding areas is similar to the embodiment.

The predetermined condition may further include a temporal element. Specifically, the predetermined condition may also include a condition (hereinafter a fourth condition) that two or more threads are generated by an identical cause in a fourth time period (60 seconds, for example) in one equipment. The predetermined condition may also include a condition (hereinafter a fifth condition) that two or more threads are generated by an identical cause in a fifth time period (120 seconds, for example) that is longer than the fourth time period in two or more equipments provided in one area. The predetermined condition may also include a condition (hereinafter a sixth condition) that two or more threads are generated by an identical cause in a sixth time period (180 seconds, for example) that is longer than the fifth time period in two or more equipments provided in two or more areas.

Here, the fourth, fifth and sixth conditions need not be regarded as exclusive conditions. That is, two or more conditions among the fourth, fifth and sixth conditions may be satisfied simultaneously.

The fourth condition (that is, the fourth time period) according to the modified example 1 may be the same as the first condition (that is, the first time period) according to the embodiment or may differ from the first condition according to the embodiment. The fifth condition (that is, the fifth time period) according to the modified example 1 may be the same as the second condition (that is, the second time period) according to the embodiment or may differ from the second condition according to the embodiment. The sixth condition (that is, the sixth time period) according to the modified example 1 may be the same as the third condition (that is, the third time period) according to the embodiment or may differ from the third condition according to the embodiment.

Under such premises, a case, in which two or more threads include a first thread which corresponds to a first error, and a second thread which corresponds to a second error that is caused by the first error, may be considered.

Figure 8:
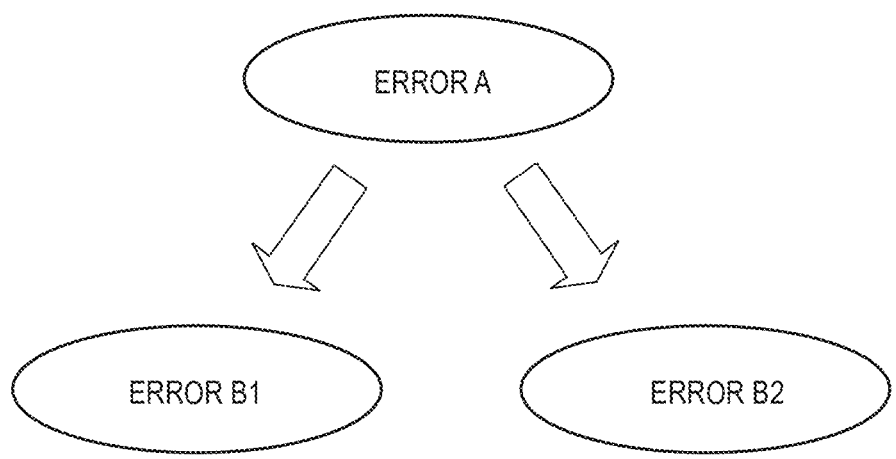
FIG. 8 is a diagram to illustrate thread integration according to a modified example 1.

First, the controller 230 may also integrate the first and second threads when there is one first error which is regarded as the cause of the second error. For example, as illustrated in FIG. 8, a case in which an error B1 and an error B2, which are caused by an error A, may be considered. In such a case, a first thread which corresponds to the error A and a second thread which corresponds to the error B1 are integrated. Similarly, a first thread which corresponds to the error A and a second thread which corresponds to the error B2 are integrated. That is, three threads are integrated into two threads. Furthermore, because the errors B1 and B2 are generated by an identical cause (the error A), a thread which corresponds to the error B1 and a thread which corresponds to the error B2 may also be integrated. That is, three threads are integrated into one thread.

Note that the error A is an abnormality of a GW (gateway) provided in the facility 300, for example. The error B1 is a defect of data which is to be transmitted from the equipment, for example. The error B2 is an equipment control abnormality owing to a communication cutoff, for example.

Figure 9:
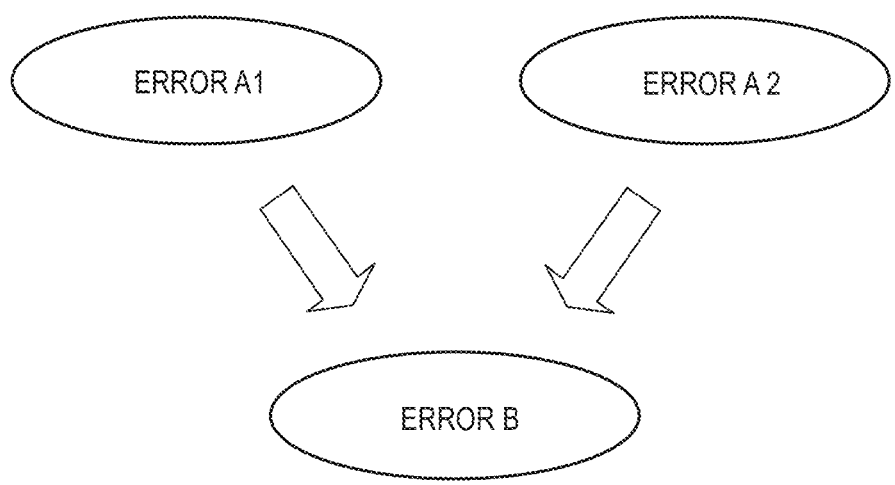
FIG. 9 is a diagram to illustrate thread integration according to the modified example 1.

Second, the controller 230 may also integrate the first and second threads when there are two or more of the first error which is regarded as the cause of the second error. For example, as illustrated in FIG. 9, a case in which an error B, which is caused by the errors A1 and A2, may be considered. In such a case, a first thread which corresponds to the error A1 and a second thread which corresponds to the error B are not integrated. Similarly, a first thread which corresponds to the error A2 and a second thread which corresponds to the error B are not integrated.

Note that the error A1 is an abnormality of a GW (gateway) provided in the facility 300, for example. The error A2 is an abnormality in a portion of an apparatus provided in the equipment, for example. The error B is an equipment control abnormality owing to a communication cutoff or an abnormality in a portion of an apparatus, for example.

Figure 10:
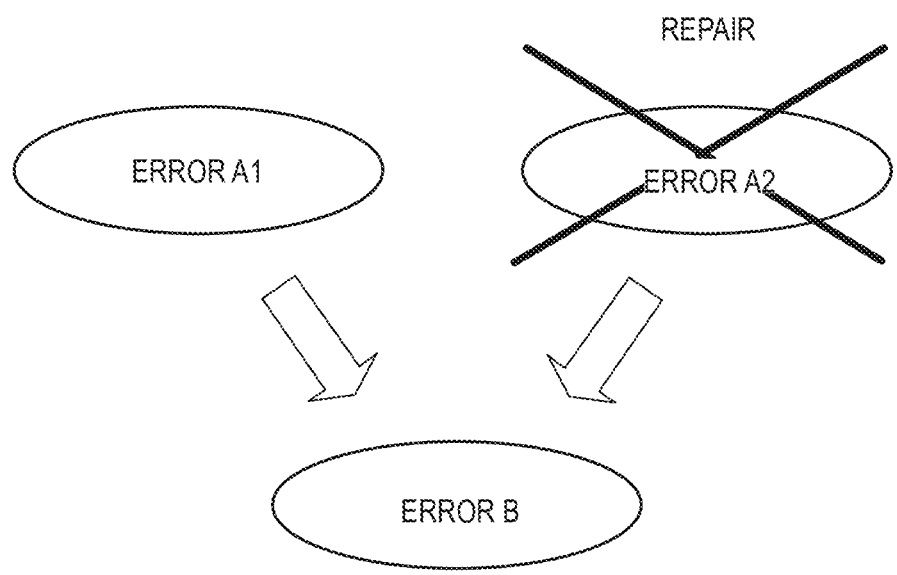
FIG. 10 is a diagram to illustrate thread integration according to the modified example 1.

Third, when, among the two or more first errors, the second error is not repaired even though the remaining first error excepting one first error is repaired, the controller 230 may also integrate a first thread which corresponds to the one first error and a second thread which corresponds to the second error. Furthermore, a temporal element may also be considered. Specifically, when the second error is not repaired even when a predetermined period has elapsed since the remaining first error has been repaired, the controller 230 may also integrate a first thread which corresponds to the one first error and a second thread which corresponds to the second error. For example, as illustrated in FIG. 10, a case in which an error A2 has been restored from the state illustrated in FIG. 9 may be considered. In such a case, a first thread which corresponds to the error A1 and a second thread which corresponds to the error B are integrated.

Equipment Management Method

Figure 11:
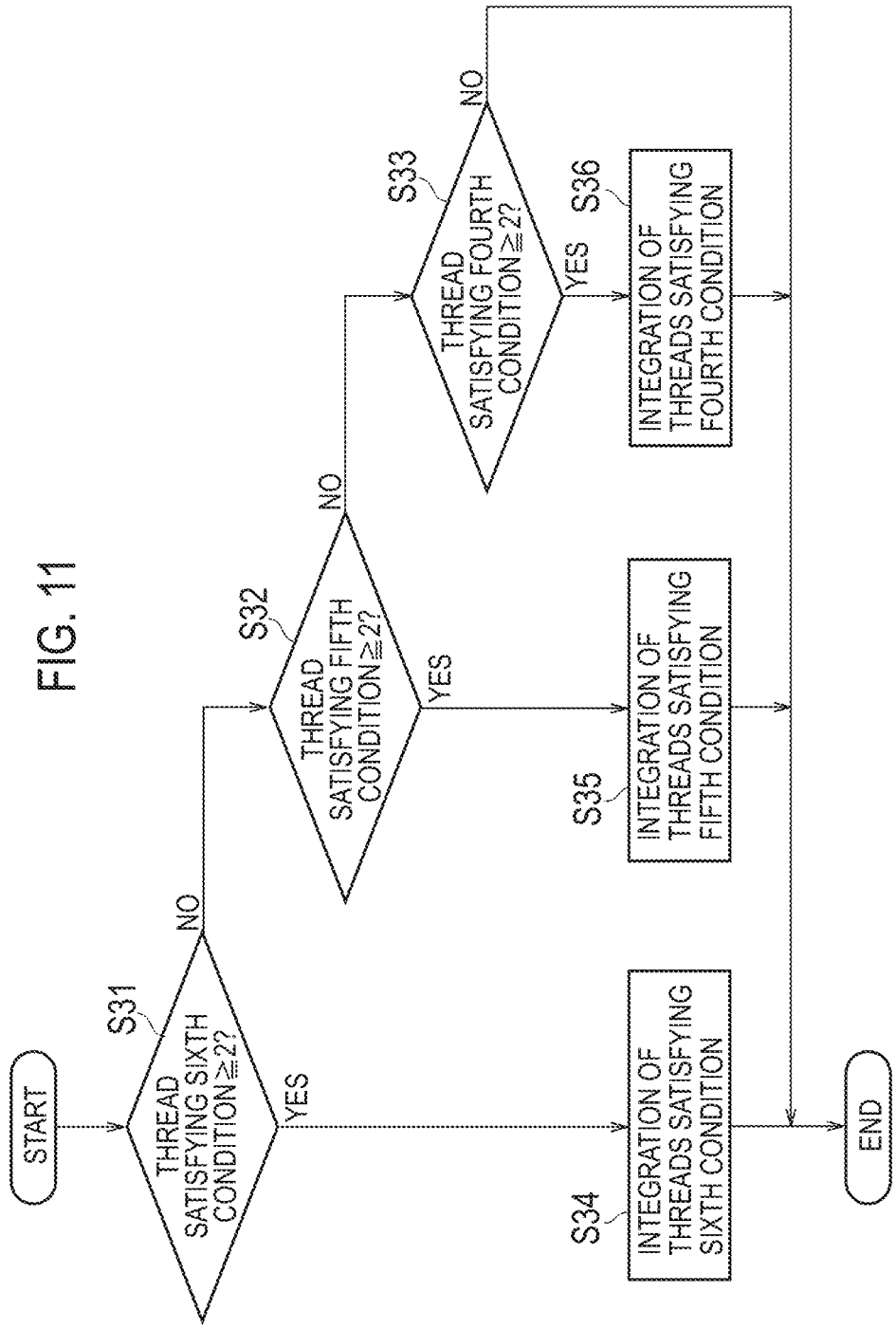
FIG. 11 is a diagram illustrating an equipment management method according to the modified example 1.

An equipment management method according to the modified example 1 will be explained hereinbelow. FIG. 11 is a flow that is repeated for each predetermined cycle (5 minutes, for example). The predetermined cycle may also be a longer cycle than the aforementioned sixth time period, for example.

As illustrated in FIG. 11, in step S31, the equipment management apparatus 200 determines whether or not there are two or more threads which satisfy the aforementioned sixth condition. When the determination result is YES, the processing of step S34 is performed, and when the determination result is NO, the processing of step S32 is performed.

In step S32, the equipment management apparatus 200 determines whether or not there are two or more threads which satisfy the aforementioned fifth condition. When the determination result is YES, the processing of step S35 is performed, and when the determination result is NO, the processing of step S33 is performed.

In step S33, the equipment management apparatus 200 determines whether or not there are two or more threads which satisfy the aforementioned fourth condition. When the determination result is YES, the processing of step S36 is performed, and when the determination result is NO, the series of processing ends.

In step S34, the equipment management apparatus 200 integrates two or more threads which satisfy the sixth condition.

In step S35, the equipment management apparatus 200 integrates two or more threads which satisfy the fifth condition.

In step S36, the equipment management apparatus 200 integrates two or more threads which satisfy the fourth condition.

In FIG. 11, a case in which the fourth, fifth, and sixth conditions are used as predetermined conditions is illustrated as an example. However, the embodiment is not limited to or by such a case. The predetermined conditions may also include a temporal element. In addition, as illustrated in FIGS. 8 to 10, it may be determined whether or not to integrate two or more threads according to whether or not there are two or more of the first error which is regarded as the cause of the second error.

Action and Effect

In the modified example 1, the equipment management apparatus 200 integrates two or more threads when two or more threads satisfy a predetermined condition. With such a configuration, in comparison with a case where a thread is managed for each error, the work load of the user who confirms the threads can be alleviated.

In the modified example 1, the equipment management apparatus 200 does not integrate two or more threads when two or more threads do not satisfy a predetermined condition. In this configuration, instances where error generation is overlooked and where error processing is omitted can be reduced because the integration of two or more errors into one thread is not performed without restriction.

Modified Example 2

A modified example 2 of the embodiment will be explained hereinbelow. Points of difference from the embodiment will primarily be explained hereinbelow. The modified example 2 can be combined with at least one of the aforementioned embodiment and modified example 1.

In the modified example 2, the controller 230 of the equipment management apparatus 200 manages a priority of a thread according to the content of an error. For example, the controller 230 manages a priority of a thread which corresponds to an error containing content which has a relatively small effect on the facility 300 at a low priority, and manages a priority of a thread which corresponds to an error containing content which has a relatively large effect on the facility 300 at a high priority. The controller 230 may also modify a display aspect in a list of threads according to the priority of a thread. For example, the controller 230 may display a high-priority thread in a first aspect and display a low-priority thread in a second aspect that differs from the first aspect. The first aspect may also be more prominent than the second aspect. The first aspect is an aspect in which a character string is emphasized by boldface type or a red marker, or the like, for example.

Under such premises, the controller 230 manages a first priority as a thread priority when a predetermined error has been generated out of a maintenance period. On the other hand, when a predetermined error has been generated within the maintenance period, the controller 230 manages a second priority which is lower than the first priority as the thread priority. That is, the priority of a thread which corresponds to a predetermined error is modified according to whether or not the predetermined error has been generated within the maintenance period.

Here, the maintenance period is stored in the maintenance information DB 212, as explained in the embodiment. A predetermined error may also be an error that is reported to the equipment management apparatus 200 by an alert transmitted from the facility 300.

When a predetermined error is not repaired even when the maintenance period has ended, the controller 230 may also restore the second priority to the first priority. In other words, when the cause of the predetermined error is not maintenance, the controller 230 may also restore the second priority to the first priority.

When a thread which corresponds to a predetermined error is managed at a first priority, the controller 230 may handle the error notification using a first method, and when a thread which corresponds to a predetermined error is managed at a second priority, the controller 230 may handle the error notification using a second method which differs from the first method.

The first method may be a method in which an error notification is transmitted according to the generation of a predetermined error irrespective of the maintenance period, for example. The second method may be a method in which an error notification is not issued in at least the maintenance period. In addition, the second method may be a method in which an error notification is not issued after the maintenance period. In this second method, two or more predetermined errors generated in the maintenance period may also be integrated in one error notification. As in the embodiment, when two or more predetermined errors generated in the maintenance period satisfy a predetermined condition, the two or more predetermined errors may also be integrated in one error notification.

The first method may also be a method in which an error notification is issued in a first aspect. The second method may also be a method in which an error notification is issued in a second aspect which is different from the first aspect. The first aspect may also be more prominent than the second aspect. The first aspect is an aspect in which a character string is emphasized by boldface type or a red marker, or the like, for example.

Equipment Management Method

Figure 12:
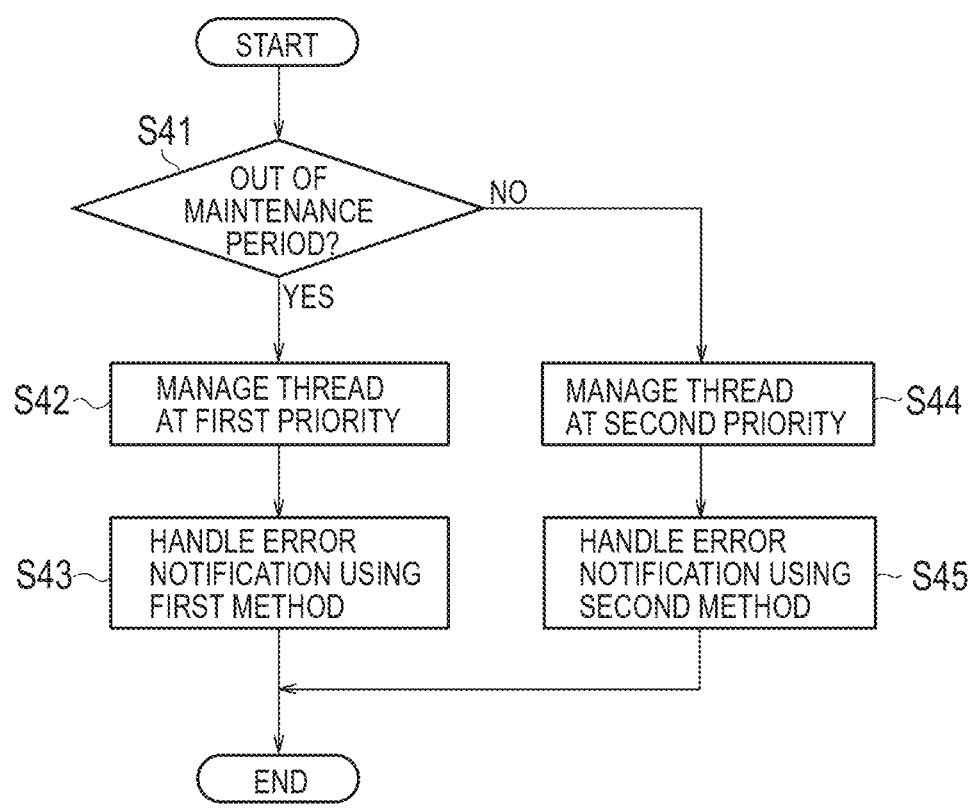
FIG. 12 is a diagram illustrating an equipment management method according to a modified example 2.

An equipment management method according to the modified example 2 will be explained hereinbelow. FIG. 12 is a flow which is executed when an alert has been received from the facility 300.

As illustrated in FIG. 12, in step S41, the equipment management apparatus 200 determines whether or not a predetermined error has been generated out of the maintenance period. When the determination result is YES, the processing of step S42 is performed. When the determination result is NO, the processing of step S44 is performed.

In step S42, the equipment management apparatus 200 manages a thread which corresponds to the predetermined error at a first priority. In a list of threads, the equipment management apparatus 200 may also display the thread which corresponds to the predetermined error in a first aspect.

In step S43, the equipment management apparatus 200 handles an error notification using a first method. The details of the first method are as described hereinabove.

In step S44, the equipment management apparatus 200 manages a thread which corresponds to the predetermined error at a second priority. In the list of threads, the equipment management apparatus 200 may also display the thread which corresponds to the predetermined error in a second aspect. The second aspect of step S44 is more prominent than the first aspect of step S42.

In step S45, the equipment management apparatus 200 handles an error notification using a second method. The details of the second method are as described hereinabove.

Action and Effect

In the modified example 2, when a predetermined error has been generated out of the maintenance period, the equipment management apparatus 200 manages a first priority as the thread priority. On the other hand, when a predetermined error has been generated within the maintenance period, the equipment management apparatus 200 manages a second priority which is lower than the first priority as the thread priority.

With such a configuration, the focus is directed toward the possibility of the predetermined error occurring frequently within the maintenance period, and the work load of the user who confirms the threads can be alleviated by lowering the priority of the thread which corresponds to this predetermined error.

Modified Example 3

A modified example 3 of the embodiment will be explained hereinbelow. Points of difference from the embodiment will primarily be explained hereinbelow. The modified example 3 can be combined with at least any one of the aforementioned embodiment, modified example 1, and modified example 2.

Figure 13:
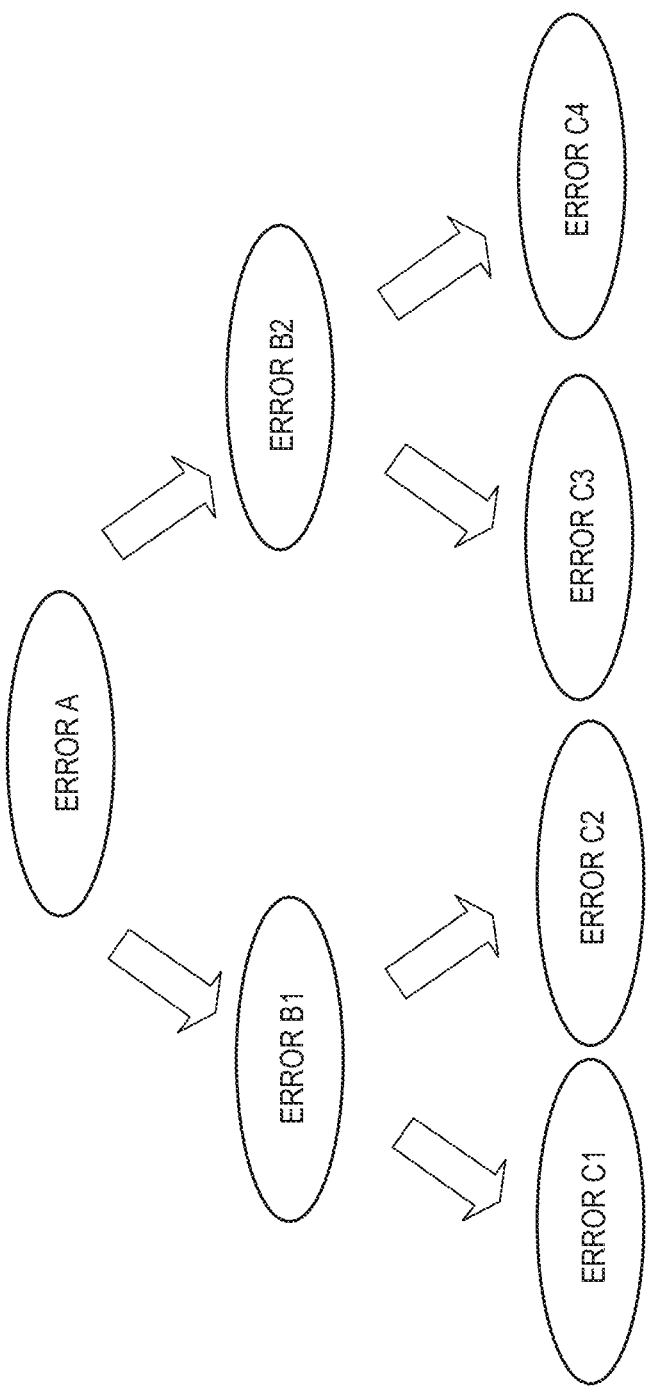
FIG. 13 is a diagram to illustrate an error hierarchy structure according to a modified example 3.

In the modified example 3, the controller 230 of the equipment management apparatus 200 specifies an error hierarchy structure, as illustrated in FIG. 13. Specifically, errors B1 and B2 which are caused by an error A are generated, errors C1 and C2 which are caused by the error B1 are generated, and errors C3 and C4 which are caused by the error B2 are generated. For example, the error A is a communication abnormality in a network server which relays communication between the facility 300 and the equipment management apparatus 200. The error B1 is an abnormality in a gateway provided in a facility 300A and the error B2 is a communication abnormality in a gateway provided in a facility 300B. The errors C1 and C2 are control anomalies in equipment provided in the facility 300A and the errors C3 and C4 are control anomalies in equipment provided in the facility 300B.

In such a case, the controller 230 may also integrate the error A, the errors B1 to B2 and the errors C1 to C4 into one error notification, as in the embodiment. Here, the one error notification may include information indicating the generation of the error A without including information indicating the errors B1 to B2 and the errors C1 to C4.

In addition, the controller 230 may integrate the threads which correspond to the error A, the errors B1 to B2 and the errors C1 to C4, as in the modified example 1. The integrated threads may also include an alert and a processing status for the error A without including an alert and a processing status for the errors B1 to B2 and the errors C1 to C4.

Thus, the equipment management apparatus 200 is able to reduce the number of error notifications or threads by specifying two or more error hierarchy structures and integrating errors which have the hierarchy structures. The specification of hierarchy structures may also be performed by studying previously generated errors.

Modified Example 4

A modified example 4 of the embodiment will be explained hereinbelow. Points of difference from the embodiment will primarily be explained hereinbelow. The modified example 4 can be combined with at least any one of the aforementioned embodiment, modified example 1, modified example 2, and modified example 3.

In the modified example 4, the controller 230 of the equipment management apparatus 200 integrates two or more threads which satisfy a predetermined condition, as in the modified example 1. The predetermined condition is that the same error should recur prior to completing the error processing.

For example, as illustrated in FIGS. 14 to 17, the list of threads includes items such as "management ID," "details," "status," "time elapsed," "facility," "equipment type," "target equipment," "cause," "operating status," and "continuous status".

The "management ID" is an identifier which identifies the thread. "Details" is an icon for displaying the details of the thread. "Status" is the aforementioned processing status. "Time elapsed" is the time period that has elapsed since the error has been generated. "Facility" is a name or identifier of a facility where equipment in which the error is generated is provided. "Equipment type" is a type of equipment in which the error is generated. "Target equipment" is a name or identifier of equipment in which the error is generated. "Cause" is a code indicating content of the error. "Operating status" is the operating ratio of the equipment in which the error is generated under the premise that the operating ratio in a state where an error has not been generated is 100%. "Continuous status" is a continuous status of an error and may also include a recurrence count which indicates the number of times an error has recurred.

As illustrated in FIG. 14, a thread whose management ID is A15000004 signifies that error processing has not been arranged and that the error has recurred 3 times. Furthermore, this thread signifies that the error is continuous.

As illustrated in FIG. 15, a thread whose management ID is A15000005 signifies that error processing has been arranged but the error has recurred 2 times. Furthermore, this thread signifies that the error is being repaired by an automatic repair. An automatic repair is processing in which an automatic repair of equipment is attempted by restarting the equipment.

As illustrated in FIG. 16, a thread whose management ID is A15000006 signifies that error processing has been arranged. This thread signifies that an equipment error is repaired by means of a provisional solution to the error. A provisional solution is emergency processing in which maintenance is still required.

As illustrated in FIG. 17, a thread whose management ID is A15000006 signifies that error processing has been arranged. This thread signifies that after an equipment error has been repaired by means of a provisional solution, the error has recurred.

In a case where this thread management is performed, even when an error has recurred after the error is repaired by means of automatic repair or a provisional solution, the controller 230 integrates the recurring error into an existing thread without generating a new thread which corresponds to the recurring error. In addition, even when a recurring error is integrated into an existing thread, the controller 230 computes the recurrence count in the existing thread.

On the other hand, when an error has recurred after the error is repaired by means of maintenance rather than automatic repair or a provisional solution, the controller 230 may also generate a new thread which corresponds to the recurring error. In addition, the controller 230 may compute the recurrence count in the new thread which corresponds to the recurring error.

Another Embodiment

The present invention has been described by means of the foregoing embodiment but the description and the drawings of the parts in this disclosure should not be understood as limiting the invention. Based on this disclosure, a variety of alternative embodiments, examples of execution, and operation technology are obvious to a person skilled in the art.

In the embodiment, various databases (the equipment information DB 211, maintenance information DB 212, and thread information DB 213), which the manager 210 includes, are provided in the equipment management apparatus 200 but the embodiment is not limited to the foregoing databases. For example, at least one or more databases among the equipment information DB 211, maintenance information DB 212, and thread information DB 213 may also be provided in a server that is coupled to the equipment management apparatus 200 via the network 120.

Note that the entire contents of Japanese patent application No. 2017-064898 (published on Mar. 29, 2017) are incorporated herein by reference.

The invention claimed is:

1. An equipment management method, comprising:
registering, in a database, an alert that includes content of an equipment error;
registering, in the database, a processing status that includes processing of the error;
managing a thread for managing the alert and the processing status in a one-to-one relationship; and
transmitting, to a user terminal, an error notification that includes information indicating generation of the error,
wherein the transmitting to the user terminal the error notification includes, when two or more errors do not satisfy a predetermined condition, not integrating the two or more errors in one error notification, and, when the two or more errors satisfy the predetermined condition, integrating the two or more errors in one error notification, and
wherein the predetermined condition includes at least any one of:

a condition that the two or more errors are generated by an identical cause in a first time period in one equipment;

a condition that the two or more errors are generated by an identical cause in a second time period that is longer than the first time period in two or more equipments which are provided in one area;

a condition that the two or more errors are generated by an identical cause in the second time period in two or more equipments which are provided in one area; and a condition that the two or more errors are generated by an identical cause in a third time period that is longer than the second time period in two or more equipments which are provided in two or more areas.

2. An equipment management method, comprising:

registering, in a database, an alert that includes content of an equipment error;

registering, in the database, a processing status that includes processing of the error; and managing a thread for managing the alert and the processing status in a one-to-one relationship, wherein the managing the thread includes, when two or more threads do not satisfy a predetermined condition, not integrating the two or more threads, and, when the two or more threads satisfy the predetermined condition, integrating the two or more threads.

3. The equipment management method according to claim 2, wherein the predetermined condition includes a condition that the two or more threads are generated by an identical cause.

4. The equipment management method according to claim 2, wherein the predetermined condition includes a condition that the two or more threads are generated by an identical cause in one equipment.

5. An equipment management method, comprising:

registering, in a database, an alert that includes content of an equipment error;

registering, in the database, a processing status that includes processing of the error;

managing a thread for managing the alert and the processing status in a one-to-one relationship; and transmitting, to a user terminal, an error notification that includes information indicating generation of the error, wherein the transmitting to the user terminal the error notification includes, when two or more errors do not satisfy a predetermined condition, not integrating the two or more errors in one error notification, and, when the two or more errors satisfy the predetermined condition, integrating the two or more errors in one error notification, and wherein the managing the thread includes:

managing a priority of the thread according to content of the error;

managing a first priority as the priority of the thread when a predetermined error has been generated out of a maintenance period of the equipment; and managing a second priority which is lower than the first priority as the priority of the thread when the predetermined error has been generated within the maintenance period.

6. The equipment management method according to claim 5, wherein the managing the thread includes restoring the second priority to the first priority when the predetermined error is not repaired even when the maintenance period has ended.

7. The equipment management method according to claim 6, further comprising:

transmitting, to the user terminal, an error notification which includes information indicating generation of the predetermined error, wherein the transmitting to the user terminal the error notification includes:

handling the error notification using a first method when the thread which corresponds to the predetermined error is managed at the first priority; and handling the error notification using a second method that differs from the first method when the thread which corresponds to the predetermined error is managed at the second priority.

8. The equipment management method according to claim 7, wherein the second method is a method in which the error notification is not issued in at least the maintenance period.

9. The equipment management method according to claim 8, wherein the second method is a method in which the error notification is issued after the maintenance period.

10. The equipment management method according to claim 7, wherein the first method is a method in which the error notification is issued in a first aspect, and the second method is a method in which the error notification is issued in a second aspect which is different from the first aspect.

11. An equipment management apparatus, comprising:

a controller configured to register, in a database, an alert that includes content of an equipment error; and a transmitter configured to transmit, to a user terminal, an error notification that includes information indicating generation of the error, wherein the controller is configured to register, in the database, a processing status that includes processing of the error, and manage a thread for managing the alert and the processing status in a one-to-one relationship, wherein the transmitter is configured to not integrate two or more errors in one error notification when the two or more errors do not satisfy a predetermined condition and to integrate the two or more errors in one error notification when the two or more errors satisfy the predetermined condition, and wherein the predetermined condition includes at least any one of:

a condition that the two or more errors are generated by an identical cause in a first time period in one equipment;

a condition that the two or more errors are generated by an identical cause in a second time period that is longer than the first time period in two or more equipments which are provided in one area;

a condition that the two or more errors are generated by an identical cause in the second time period in two or more equipments which are provided in one area; and a condition that the two or more errors are generated by an identical cause in a third time period that is longer than the second time period in two or more equipments which are provided in two or more areas.

12. An equipment management system having at least an equipment management apparatus,
wherein the equipment management apparatus comprises:
a controller configured to register, in a database, an alert that includes content of an equipment error; and
a transmitter configured to transmit, to a user terminal, an error notification that includes information indicating generation of the error,
wherein the controller is configured to
register, in the database, a processing status that includes processing of the error, and
manage a thread for managing the alert and the processing status in a one-to-one relationship,
wherein the transmitter is configured to not integrate two or more errors in one error notification when the two or more errors do not satisfy a predetermined condition and to integrate the two or more errors in one error notification when the two or more errors satisfy the predetermined condition, and
wherein the predetermined condition includes at least any one of:
a condition that the two or more errors are generated by an identical cause in a first time period in one equipment;
a condition that the two or more errors are generated by an identical cause in a second time period that is longer than the first time period in two or more equipments which are provided in one area;
a condition that the two or more errors are generated by an identical cause in the second time period in two or more equipments which are provided in one area; and
a condition that the two or more errors are generated by an identical cause in a third time period that is longer than the second time period in two or more equipments which are provided in two or more areas.

\* \* \* \* \*